United States Patent
Miyahara (10) Patent No.: US 6,826,479 B2
(45) Date of Patent: Nov. 30, 2004

(54) METHOD AND APPARATUS FOR TARGET VEHICLE IDENTIFICATION IN AUTOMATIC CRUISE CONTROL AND COLLISION AVOIDANCE SYSTEMS

(75) Inventor: Shunji Miyahara, Yokohama (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 46 days.

(21) Appl. No.: 10/161,112

(22) Filed: Jun. 3, 2002

(65) Prior Publication Data

US 2003/0225519 A1 Dec. 4, 2003

(51) Int. Cl.$^7$ ............................ G06F 17/10; G06G 7/78
(52) U.S. Cl. ...................... 701/301; 701/96; 701/300; 180/168; 340/903
(58) Field of Search ............................ 701/1, 23–26, 701/93, 96, 300–301; 180/167–170, 271, 282; 340/901–905, 435–436

(56) References Cited

U.S. PATENT DOCUMENTS

| | | | | |
|---|---|---|---|---|
| 5,130,934 A | * | 7/1992 | Ikeuchi | .......................... 700/90 |
| 5,572,428 A | | 11/1996 | Ishida et al. | ................. 701/301 |
| 5,754,099 A | | 5/1998 | Nishimura et al. | .......... 340/435 |
| 5,955,967 A | | 9/1999 | Yamada | ....................... 340/904 |
| 5,959,569 A | | 9/1999 | Khodabhai | .................... 342/70 |
| 5,964,822 A | | 10/1999 | Alland et al. | ................ 701/301 |
| 6,035,053 A | * | 3/2000 | Yoshioka et al. | ............ 382/104 |
| 6,230,093 B1 | * | 5/2001 | Michi et al. | ................... 701/96 |
| 6,265,991 B1 | | 7/2001 | Nishiwaki et al. | ........... 340/903 |
| 6,484,078 B1 | * | 11/2002 | Kageyama | ..................... 701/25 |
| 6,546,327 B2 | * | 4/2003 | Hattori et al. | ................. 701/96 |
| 6,567,039 B2 | * | 5/2003 | Shirai et al. | ................... 342/70 |
| 2002/0016663 A1 | | 2/2002 | Nakamura et al. | ............ 701/96 |
| 2002/0099491 A1 | * | 7/2002 | Akabori et al. | ............... 701/96 |
| 2002/0165645 A1 | * | 11/2002 | Kageyama | ...................... 701/1 |

FOREIGN PATENT DOCUMENTS

| | | | |
|---|---|---|---|
| EP | 0 890 823 A3 | 1/1999 | |
| JP | 9288179 A | 11/1997 | |
| JP | 11125532 A | 5/1999 | |
| JP | 11312016 A | * 11/1999 | ............ G05D/1/02 |
| JP | 2001023099 A | 1/2001 | |

* cited by examiner

Primary Examiner—Jacques H. Louis-Jacques
(74) Attorney, Agent, or Firm—Brinks Hofer; Gilson & Lione (57) ABSTRACT

An apparatus and method are provided for identifying a preceding vehicle as a target vehicle in transient and non-transient situations. The method generally includes, estimating a position of the target vehicle relative to a position of an ACC vehicle from the position of the ACC vehicle to create a target vehicle estimated position; creating a time-dependent position trace of the target vehicle; estimating a radius of the position trace of the target vehicle by applying circular curve fitting to the position trace of the target vehicle; and determining whether the target vehicle is in an ACC vehicle lane using the radius of the position trace, the target vehicle estimated position and the position of the ACC vehicle.

36 Claims, 9 Drawing Sheets

METHOD AND APPARATUS FOR TARGET VEHICLE IDENTIFICATION IN AUTOMATIC CRUISE CONTROL AND COLLISION AVOIDANCE SYSTEMS

BACKGROUND

Conventional cruise control systems regulate the speed of a vehicle at a pre-determined value. Basically, conventional cruise control systems control the speed of a vehicle by actuating the vehicle's throttle. Adaptive cruise control ("ACC") systems provide enhancements to conventional cruise control systems. Generally, ACC systems control the speed of a vehicle (the "ACC vehicle") based on the identification of vehicles preceding the ACC vehicle ("preceding vehicles") that are in the path of or in the same lane as the ACC vehicle ("target vehicles"). A preceding vehicle is considered to be "in the path" of an ACC vehicle if the positional relationship between the preceding and ACC vehicles is such that if the ACC vehicle remains on its course and travels faster than the preceding vehicle, it will eventually collide with the preceding vehicle. ACC systems control the ACC vehicle's speed to follow a value set by the ACC vehicle operator when no target vehicles have been identified. However, when the target vehicle has been identified and is moving more slowly than the ACC vehicle, the ACC system will track the target vehicle and control the speed of the ACC vehicle so that the ACC vehicle will follow the target vehicle at a safe distance. When the target vehicle moves out of the path or lane of the ACC vehicle, the ACC system ceases tracking the preceding vehicle and returns the ACC vehicle to the value set by the ACC vehicle operator.

ACC systems generally include sensors, a target identification system, a control system, and a mechanism for controlling the ACC vehicle's speed. In general, the sensors obtain information regarding the speed and position (including the location and bearing) of the ACC vehicle and the speed and relative position (including the location and azimuth angle relative to the ACC vehicle) of any preceding vehicles. This information is used by the target identification system to determine which, if any, of the preceding vehicles are target vehicles. The information is also used by the control system to control the speed of the ACC vehicle by sending the appropriate signals to the mechanism for controlling the ACC vehicle's speed.

The sensors include a sensor for sensing the relative speed, location and azimuth angle of the preceding vehicle (the "preceding vehicle sensor") and sensors for sensing the speed, location and bearing of the ACC vehicle (the "ACC vehicle sensors"). The preceding vehicle sensor generally includes a radar source and detector. Alternatively, the preceding vehicle sensor may include any other electromagnetic (including millimeter wave and laser) and sound sources and/or detectors. The preceding vehicle sensor can obtain the location, and azimuth angle of the preceding vehicle relative to the ACC vehicle (the "relative position") and the speed of the preceding vehicle. The ACC vehicle sensors generally include a speedometer to measure the speed of the ACC vehicle and a yaw rate sensor or a steering wheel sensor to determine the location and bearing (the "position") of the ACC vehicle and/or the curvature of the ACC vehicle's present path from the angular velocity of the ACC vehicle.

The target identification system determines which of the preceding vehicles is a target vehicle. Additionally, the target identification system may distinguish preceding vehicles from road-side objects. The target identification system may determine which of the preceding vehicles is a target vehicle by determining which of the preceding vehicles is in the same lane as or is in the path of the ACC vehicle. Once a preceding vehicle is identified as a target vehicle, its position is monitored ("tracked") as a target by the target vehicle sensor and its location and azimuth angle are used by the ACC control.

The control system generally includes a system that controls the ACC vehicle's speed on the basis of the position of the target vehicle relative to the ACC vehicle obtained by the preceding vehicle sensor and the speed and position of the ACC vehicle obtained from the ACC vehicle sensors. The mechanism for controlling the ACC vehicle's speed is generally a throttle control and/or a brake control which is generally controlled by the control system.

Figure 1A:
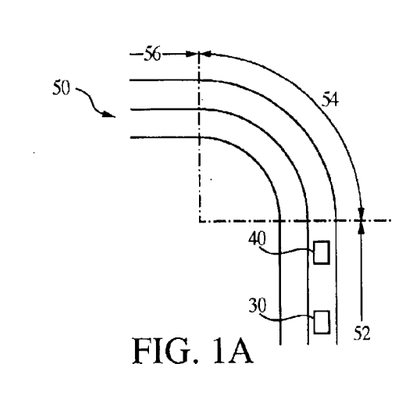
FIG. 1A is a diagram of a non-transient situation.
Figure 1B:
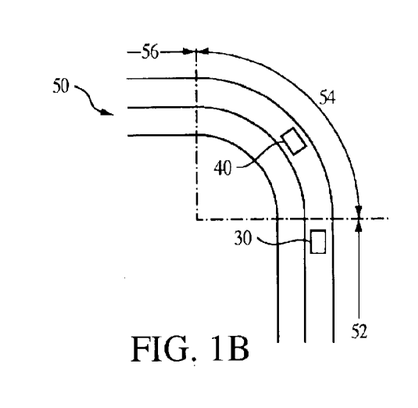
FIG. 1B is a diagram of a transient situation.
Figure 1C:
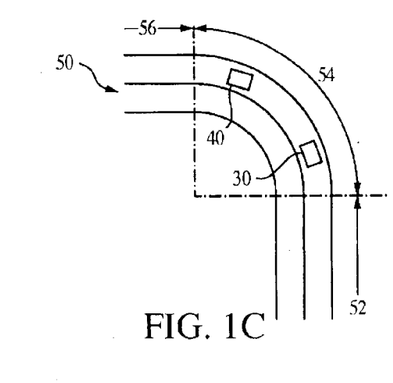
FIG. 1C is a diagram of an additional non-transient situation.
Figure 1D:
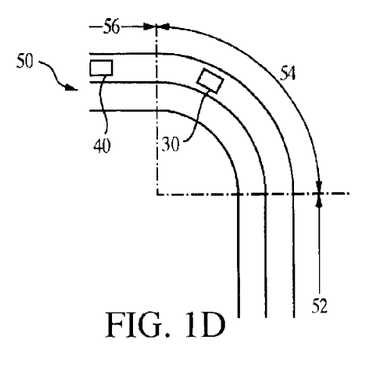
FIG. 1D is a diagram of an additional transient situation.
Figure 1E:
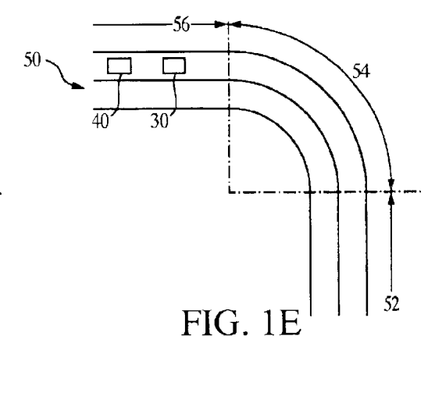
FIG. 1E is a diagram of an additional non-transient situation.
Figure 1F:
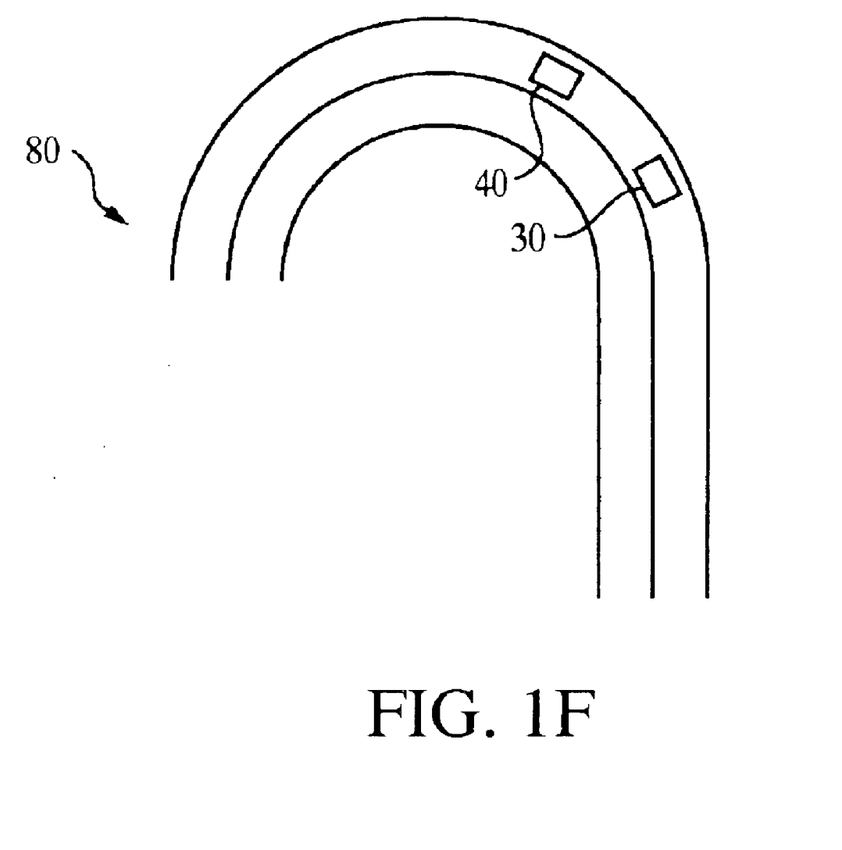
FIG. 1F is a diagram of an additional transient situation.

However, these known ACC systems are not typically able to accurately identify a target vehicle in certain situations. For example, FIGS. 1A–1F illustrate the some of the various positional situations that exist for an ACC vehicle and a preceding vehicle traveling on the same road. FIGS. 1A–1E illustratrate an ACC vehicle 30 following a target vehicle 40 around a curve 54 in a road 50 while FIG. 1F illustrates an ACC vehicle 30 following a target vehicle 40 on a road 80. More specifically, FIG. 1A illustrates the positional situation where both the ACC and target vehicles 30 and 40, respectively, have not yet entered the curve 54 and are in location 52 on road 50. FIG. 1B illustrates the positional situation where the ACC vehicle 30 has not yet entered the curve 54 and is in location 52 and the target vehicle 40 is in the curve 54. FIG. 1C illustrates the positional situation where both the ACC and target vehicles 30 and 40, respectively, are in the curve 54. FIG. 1D illustrates the positional situation where the ACC vehicle 30 is still in the curve 54 and the target vehicle 40 has left the curve 54 and is in location 56. FIG. 1E illustrates the positional situation where both the ACC and target vehicles 30 and 40, respectively, have left the curve and are in location 56. FIG. 1F illustrates a positional situation on a road 80 where both the ACC vehicle 30 and the target vehicle 40 are on a curve in the road 80 wherein the curvature or radius of the curve is not constant. For the positional situations shown in FIGS. 1A, 1C and 1D (the "non-transient situations" or "uniform situations"), known methods can reasonably determine whether the preceding vehicle is in the same lane as the ACC vehicle. However, these known methods encounter problems when attempting to determine whether the preceding vehicle is in the path of the ACC vehicle when the preceding and ACC vehicles are in the positional situations shown in FIGS. 1B, 1D and 1F (the "transient situations" or "non-uniform situation").

Known ACC systems have difficulty tracking target vehicles around curves in the road, namely in the "non-uniform situation." Often in these situations, known ACC systems will completely stop tracking the target vehicle. Generally, known ACC systems have no effective way of determining whether the preceding vehicle is in the same lane as or in the future path of the ACC vehicle for all positional situations. This problem is particularly acute in the positional situations shown in FIGS. 1B, 1D and 1F.

One known ACC system identifies which preceding vehicles are target vehicles by using the theoretical relationship between the azimuth angle and relative velocity between the ACC vehicle and the preceding vehicle as defined in a phase chart (see U.S. patent application Ser. No. 09/815187. This known ACC system works well for identifying a preceding vehicle as a target vehicle in the "non-uniform situation" because it can determine whether the preceding vehicle is in the path of the ACC vehicle. However, this known system cannot be applied to uniform situations for several reasons. One reason is that the relationship between the azimuth angle and relative velocity is determined empirically and therefore requires that a great deal of experimental data be collected and stored in the system. Another reason is that and the system requires many complex calculations.

BRIEF SUMMARY

It is an object to provide a method and apparatus that can identify whether a preceding vehicle is a target vehicle and if a target vehicle is in the same lane as an ACC vehicle in both the uniform and non-uniform situations without the disadvantages of the known systems. It is also an object to provide a method and apparatus for determining the radius of a curve in the road from the position trace of a preceding vehicle. It is also an object to provide a method and self-contained apparatus for determining whether a preceding vehicle is a target vehicle and if a target vehicle is in the same lane as the ACC vehicle by using the position trace of the target vehicle. It is also an object to provide an ACC system that can accurately control the speed of the ACC vehicle in all non-uniform situations as well as in uniform situations without the need for empirical data. Other objects and advantages of the methods and apparatuses disclosed herein will be apparent from the following summary and detailed description of the preferred embodiments.

An apparatus and method are provided for identifying a preceding vehicle as a target vehicle in both the uniform_ and non-uniform situations. The method generally includes, determining a position of an ACC vehicle; estimating a position of the preceding vehicle relative to the position of the ACC vehicle; creating a time-dependent position trace of the preceding vehicle; estimating a radius of the position trace of the preceding vehicle by applying circular curve fitting to the position trace of the preceding vehicle; and determining whether the preceding vehicle is a target vehicle by the degree of the fitting. The system can also determine if a target vehicle is in the same lane as the ACC vehicle by examining the position of the ACC vehicle relative to the estimated position trace of the target vehicle.

An apparatus includes a self-contained target identification system, which generally includes, a memory device that stores the position information for an ACC vehicle and the relative position information for the preceding vehicle; a processor and computer software that computes the relative position of a preceding vehicle using the position information of the ACC vehicle; creates a position trace; and estimates a radius of the position trace by using curve fitting. Curve fitting is accomplished by transforming the position trace into a $(\xi,\eta)$ local coordinate system, where the reference point is one of the positions of the preceding vehicle. The target identification system may also be included in a self-contained ACC system or collision avoidance system that also includes, a preceding vehicle sensor; at least one ACC vehicle sensor; and an ACC vehicle throttle control.

Described herein are numerous embodiments which will be understood by those skilled in the art based on the present disclosure. Some of these are described below and are represented in the drawings by means of several figures, in which:

DETAILED DESCRIPTION

Figure 2:
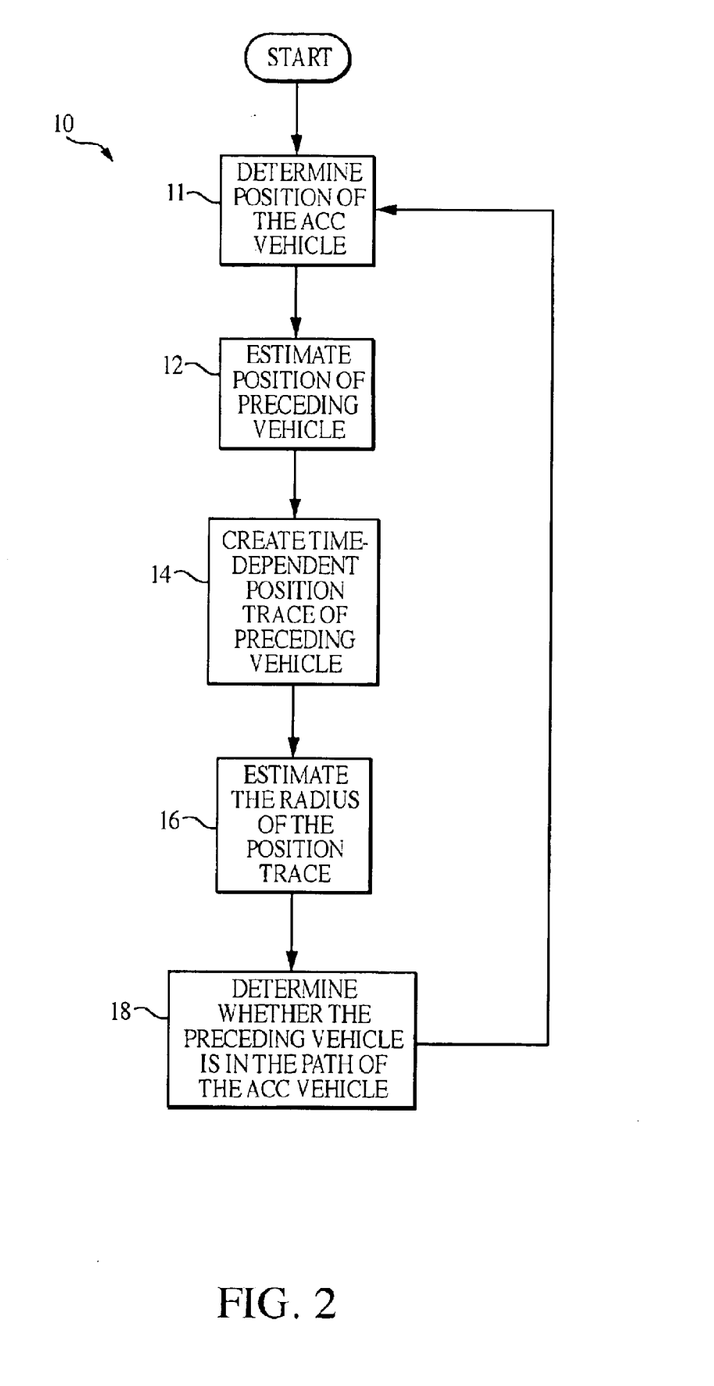
FIG. 2 is a flow chart of a method for determining whether a preceding vehicle is in the path of an ACC vehicle, according to an embodiment of the present invention.

As shown in FIG. 2, a method for determining in both the transient and non-transient situations, whether a preceding vehicle is in the path of an ACC vehicle and is thus a target vehicle 10, generally comprises: determining the position and speed of the ACC vehicle 11, estimating the position of a preceding vehicle 12, creating a time-dependant position trace of the position of the preceding vehicle 14, estimating the radius of the position trace of the preceding vehicle using curve fitting 16, and determining whether the preceding vehicle is in the path of the ACC vehicle by examining the curve fitting error.

Figure 3:
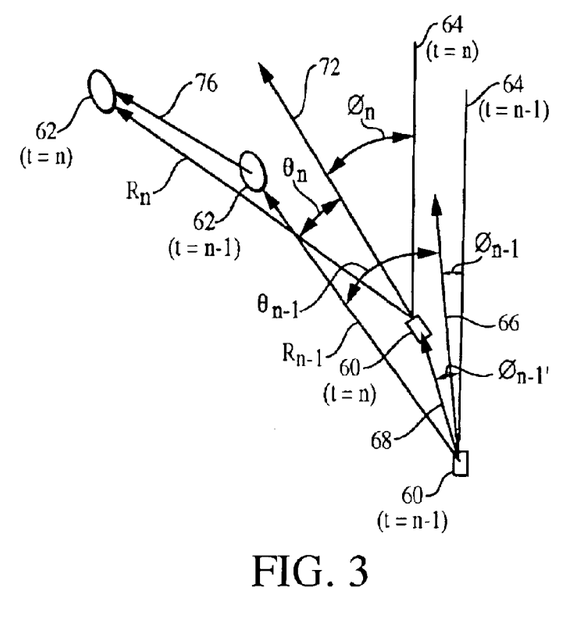
FIG. 3 is a diagram of the relationship between an ACC vehicle and a preceding vehicle.

In step 11, the position and direction of the ACC vehicle are initially assigned values for time t=0. For all time t>0, the position (including location and bearing) is calculated from values measured by the ACC vehicle sensor. The position of the ACC vehicle may initially (upon start-up of the system, before t=n−2) be assumed to have a location of (0,0) in the x-y coordinate system and a bearing along the positive y-axis (the "bearing reference"). However, any predetermined location or bearing may be used. At later times, the position of the ACC vehicle is generally obtained by measuring the speed and angular velocity of the ACC vehicle using the ACC vehicle sensors. At each point in time, the speed and angular velocity measurements are used to obtain a change in position from the previously measured or assumed position. As shown in FIG. _3, the measured change in distance 68 is equal to $v_{n-1}*dt$ and the bearing $\phi_{n-1}'=(\phi_n+\phi_{n-1})/2$, where $v_{n-1}$ and $\phi_{n-1}$ are the speed and bearing of the ACC vehicle at time=(n−1)*dt. The new location of the ACC vehicle $(x_n, y_n)$ is determined from a change in location along the x and y axes from the preceding location $(x_{n-1}, y_{n-1})$, namely, $(\hat{x}_n,\hat{y}_n)=(\hat{x}_{n-1}+\hat{v}_{n-1}\cdot dt\cdot\cos\hat{\phi}_{n-1}", \hat{y}_{n-1}+\hat{v}_{n-1}\cdot dt\cdot\cos\hat{\phi}_{n-1}")$. The speed of the ACC vehicle is obtained from the ACC vehicle sensors. The bearing is calculated from the angular velocity which is determined by integrating the yaw-rate $d\phi/dt$, which is measured by the ACC vehicle sensors.

In step 12, the position of the preceding vehicle may be estimated from the position of the ACC vehicle. The relationship between the position of the ACC vehicle and the position of the preceding vehicle is shown in FIG. 3. The estimated position of the preceding vehicle is expressed in terms of its azimuth angle $\theta$ (which is the angle between the boresight of the ACC vehicle and the direction of the preceding vehicle) and the preceding vehicle's distance from the ACC vehicle. The ACC vehicle 60 and the preceding vehicle 62 are shown at times $t=n-1$ and $t=n$. The azimuth angle $\theta$ and the distance from the ACC vehicle are determined using the target vehicle sensor located within the ACC vehicle 60. At time $t=n-1$, the azimuth angle $\theta_{n-1}$ is measured by the target vehicle sensor. By adding the azimuth angle $\theta_{n-1}$ to the bearing of the ACC vehicle $\phi_{n-1}$, the bearing of the preceding vehicle, relative to the bearing reference may be obtained. At time $t=n$, the angle between the preceding vehicle 62 and the ACC vehicle 60 is measured using the ACC vehicle sensor. Additionally, the distance between the ACC vehicle and the target vehicle $R_n$ is also measured at time $t=n$.

The location of a preceding vehicle in the x-y coordinate system $(x(t), y(t))$ is a vector which is a function of the location of the ACC vehicle and can be expressed by:

$$(x(t),y(t))=(xa(t)+R_t \cos(\phi_t+\theta_t), ya(t)+R_t \sin(\phi_t+\theta_t)) \tag{1}$$

where $t=0, \ldots, n-2, n-1, n, n+1, \ldots$, $R_t$ is the distance between the preceding vehicle and the ACC vehicle and $-(xa(t), ya(t))$ is the position of the ACC vehicle.

Step 14 of FIG. 2, creating a time-dependent position trace is accomplished by obtaining at least two positions for the preceding vehicle at two different times. Prefereably, more than two positions are obtained for the preceding vehicle. The position trace will generally be in the shape of a curve having a radius "a."

In step 16, the radius of the position trace, may be estimated by curve fitting a circle with radius "a" to the position trace via quadratic regression. The position trace is assumed to be on the circle defined by the curve fitting by the following:

$$(X-x_0)^2+(Y-y_0)^2=a^2 \tag{2}$$

Because it is likely that the circle will not correspond directly to the position trace, there will be an error between the circle defined by equation (2) and the position trace. The error "e" is defined by:

$$e=\Sigma((X_i-x_0)^2+(Y_i-y_0)^2-a^2)^2 \quad i=n, n-1, n-2 \tag{3}$$

Radius "a" and the center of the curve $(x_0, y_0)$ is chosen minimize the error "e."

Because attempting the curve fit in the (x,y) coordinate system will yield too high an amount of offset to apply the regression, equations (2) and (3) are transformed into another orthogonal coordinate system $(\xi,\eta)$ (the "local coordinate system"):

$$(x_n,y_n),(x_{n-1},y_{n-1}),(x_{n-2},y_{n-2}),(x_{n-3},y_{n-3}), \tag{4}$$

$$(\xi_n,\eta_n),(0,0),(\xi_{n-2},\eta_{n-2}),(\xi_{n-3},\eta_{n-3}), \tag{5}$$

Figure 4:
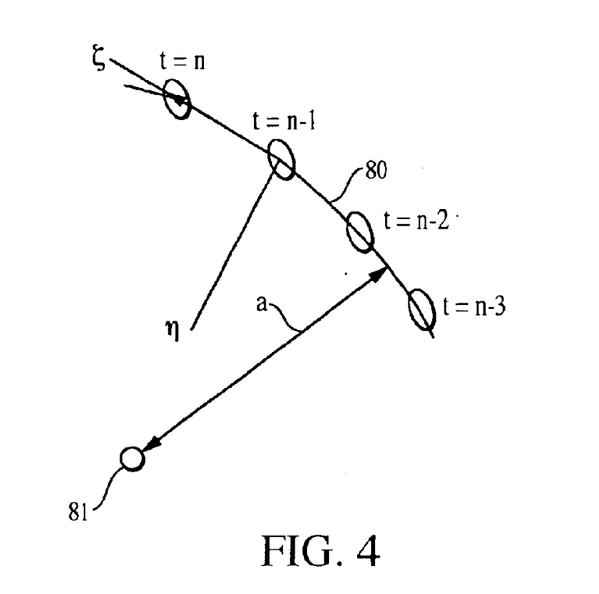
FIG. 4 is a diagram of the local coordinate, where the position at t=n−1 is a reference point and "a" is a estimated radius.

The position trace and the circle defined in equation (2) are shown in the new coordinate system in FIG. 4. $\xi$ is parallel to the direction of travel of the preceding vehicle and is therefore approximately tangent to the circle defined in equation (2) 80. $\eta$ is normal to $\xi$. In this case, the origin $((\xi_{n-1},\eta_{n-1})=(0,0))$ in the local coordinate system is chosen to correspond to the point $(X_{n-1},Y_{n-1})$ in the original (x,y) coordinate system. However, the point (0,0) in the local coordinate system may be chosen so that it corresponds with any of the points on the position trace. The radius of the circle 80 is "a" and has a center point 81 at $(\xi_c,\eta_c)$.

The new coordinates are calculated from the following equation:

$$((\hat{r}_i-\hat{r}_{n-1})\cdot\hat{\xi},(\hat{r}_i-\hat{r}_{n-1})\cdot\hat{\eta}) \quad i=n, n-1, n-2, \tag{6}$$

where $\hat{r}_i$ is the position vector of the i-th point on the circle and $\hat{\xi}$ and $\hat{\eta}$ are the unit vectors of the local coordinate system.

Equation (2) is now transformed into the local coordinate system:

$$(\xi-\xi_c)^2+(\eta-\eta_c)^2=a^2 \tag{7}$$

Because $\eta^2$ is relatively small, equation (7) may be approximated by either equation (8) or equation (9):

$$(\xi-\xi_c)^2-2\eta\eta_c+\eta_c^2=a^2 \tag{8}$$

$$\eta = \frac{1}{2\eta_c}\xi^2 - \frac{\xi_c}{\eta_c}\xi + \frac{(\eta_c^2-a^2)}{2\eta_c} \tag{9}$$

Equation (9) may now be express by the following in which the independent variable "$\xi$" and the dependent variable "$\eta$" are expressed by X and Y, respectively.:

$$Y=c0+c1X+c2X^2 \tag{10}$$

Y,X,co,c1,c2 are obtained through Matrix W, and vectors $\hat{A}$ and $\hat{Y}$:

$$W\hat{A}=\hat{Y} \tag{11}$$

$$\begin{pmatrix} n & \sum X_i & \sum X_i^2 \\ \sum X_i & \sum X_i^2 & \sum X_i^3 \\ \sum X_i^2 & \sum X_i^3 & \sum X_i^4 \end{pmatrix} \begin{pmatrix} c0 \\ c1 \\ c2 \end{pmatrix} = \begin{pmatrix} \sum Y_i \\ \sum Y_i * X_i \\ \sum Y_i * X_i^2 \end{pmatrix} \tag{12}$$

$$\begin{pmatrix} X0 & X1 & X2 \\ X1 & X2 & X3 \\ X2 & X3 & X4 \end{pmatrix} \begin{pmatrix} c0 \\ c1 \\ c2 \end{pmatrix} = \begin{pmatrix} Y \\ YX \\ YX2 \end{pmatrix} \tag{13}$$

The coefficients c0, c1 and c2 are calculated from:

$$c2 = \frac{1}{2}\eta_c \tag{14}$$

$$c1 = -\frac{\xi_c}{\eta_c} \tag{15}$$

$$c0 = \frac{(\eta_c^2-a^2)}{2\eta_c} \tag{16}$$

The solution to equation (11) results in:

$$a=-\sqrt{1/(4*c2^2)-c0/c2} \tag{17}$$

Two methods may be used to determine whether the preceding vehicle is in the same lane as the ACC vehicle and thus whether the preceding vehicle becomes a target vehicle.

The first method is used when the ACC vehicle has had the opportunity to follow the preceding vehicle on a straight portion of road before the preceding vehicle enters a curve or changes lanes. The second method is applied in all other situations, including the situation where a preceding vehicle is first detected by the ACC vehicle while both vehicles are traveling in a curve in the road.

The first method for determining whether the preceding vehicle is in the same lane as the ACC vehicle involves examining the accuracy of the radius "a" of the estimated circle. Because $|4C_2C_0|<<1$, the accuracy of "a" may be roughly estimated by:

$$\left|\frac{\sigma_{c2}}{c2}\right| < 0.25 \sim 1 \qquad (18)$$

where $\sigma_c$ is the standard deviation of the coefficient c2.
or (19) $|\sigma_a/a|<0.25$ where $\sigma_a$ is the standard deviation of the radius a of the estimated circle. Equations (18) and (19) together comprise the "regression criteria." If equation (18) or (19) is satisfied, the radius "a" of the estimated circle or the curve fitting is considered to be accurate. From this it is determined that the preceding vehicle is in the path of the ACC vehicle and therefore, that the preceding vehicle is a target vehicle. However, if either equation (18) or (19) is not satisfied, then the radius "a" of the estimated circle is not considered accurate. From this it is determined that the preceding vehicle has not entered a curve but has, in fact, changed lanes and therefore, that the preceding vehicle is not a target vehicle.

Figure 5:
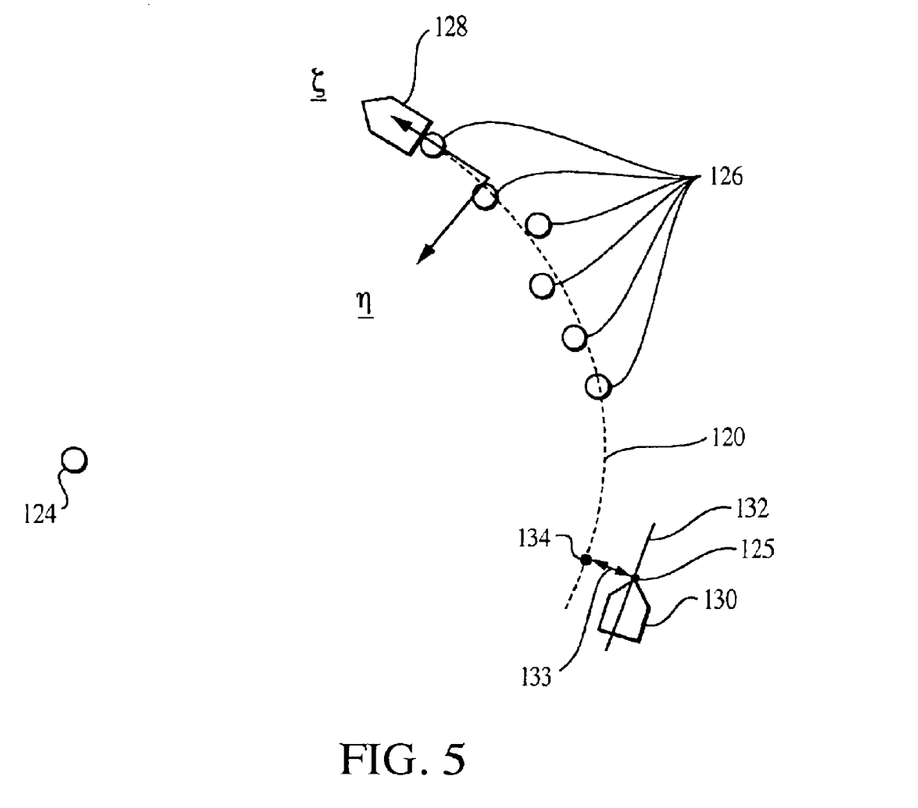
FIG. 5 is a diagram of the relationship between the position of the ACC vehicle and the curve estimated from the position trace of the preceding vehicle.

The second method used to determine whether the preceding vehicle is in the path of the ACC vehicle and thus whether the preceding vehicle becomes a target vehicle, involves examining the lateral distance of the ACC vehicle from the estimated circle obtained from the position trace of the preceding vehicle. FIG. 5 shows the position of an ACC vehicle 130 and a centerline forward point 125 relative to the estimated circle 120 of a preceding vehicle 128 in the local coordinate system. The circle was obtained through curve fitting and quadratic regression of the position trace 126 of the preceding vehicle 128, and has a center point 124. The centerline forward point 125 is generally the forward-most point on the ACC vehicle that corresponds with the ACC vehicle's centerline 132. The location of the ACC vehicle's centerline forward point 125 is determined by the ACC vehicle sensors in the (x,y) coordinate system $(X_g,Y_g)$. The location $(X_g,Y_g)$ of the ACC vehicle's centerline forward point 125 is transformed from the (x,y) coordinate system into the local coordinate system $(\xi_g, \eta_g)$. The lateral displacement 133 is determined by calculating the distance between the ACC vehicle's centerline forward point 125 $-(\xi_g, \eta_g)$ and a point on the circle $-(\xi_k, \eta_k)$ 134. The point on the circle $-(\xi_k, \eta_k)$ is the point that defines a line tangent to the circle and parallel to the ACC vehicle's centerline 132.

Once the lateral displacement 133 is determined, whether the ACC vehicle and the preceding vehicle are in the same lane is determined by evaluating the following equation:

$$|\text{lateral distance}| \leq (\text{lane width}+\text{vehicle width})/2 \qquad (20)$$

Wherein, "|lateral distance|" is the magnitude of the lateral distance, "lane width" is the width of one lane in the road in which the ACC and preceding vehicles are traveling and "vehicle width" is the width of the ACC vehicle. Therefore, if the lateral displacement of the preceding vehicle relative to the ACC vehicle is less than one-half the sum of the width of the road lane and the ACC vehicle, the preceding vehicle is determined to have entered a curve and is in the same lane as the ACC vehicle. Therefore, the preceding vehicle then becomes a target vehicle. If, however, the lateral displacement of the preceding vehicle relative to the ACC vehicle is greater than one-half the sum of the width of the road lane and the ACC vehicle, the preceding vehicle is determined to be outside of the path of the ACC vehicle and therefore, does not become a target vehicle.

Figure 6:
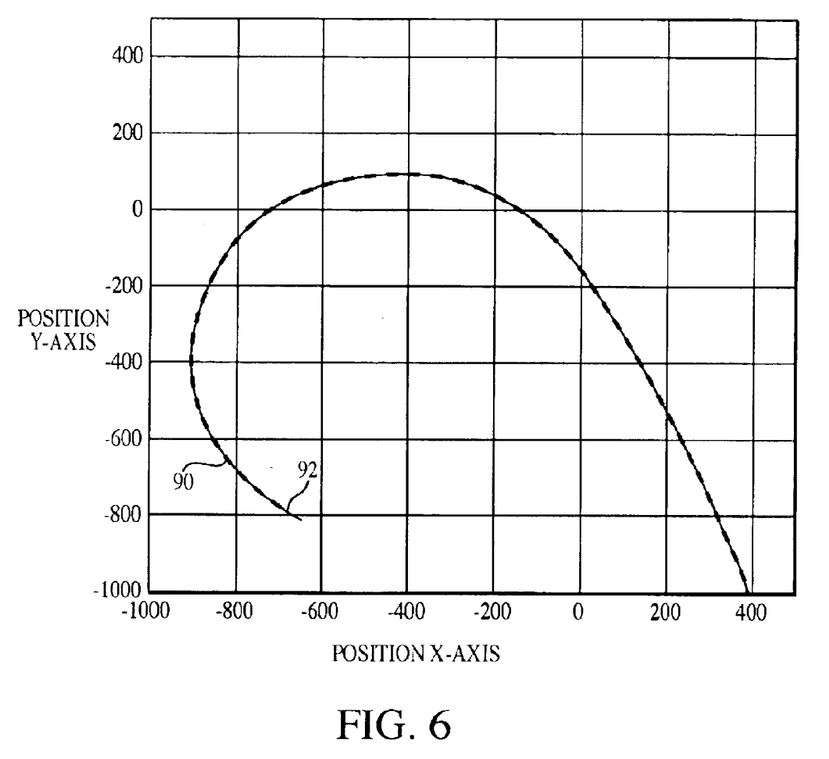
FIG. 6 is a plot of the simulated position traces of an ACC vehicle and a target vehicle, according to an embodiment of the present invention.

The method described herein has been verified through simulation. In the simulation, a preceding vehicle is followed by an ACC vehicle wherein both vehicles travel on a curve in a road wherein the road had lane widths of 3.5 meters, and the curvature (or radius) of the curve changes from 3000 meters to 480 meters. Both vehicles have a width of 1.7 meters, traveled at a velocity of 90 km/h for a distance of 60 meters around the curve. The regression criteria was set to 0.25. The location of the ACC vehicle over the distance traveled (the "ACC vehicle position trace") was measured and used to determine the position trace of the target vehicle. As shown in FIG. 6 the ACC vehicle position trace 90 and the position trace of the preceding vehicle 92 are virtually identical.

Figure 7:
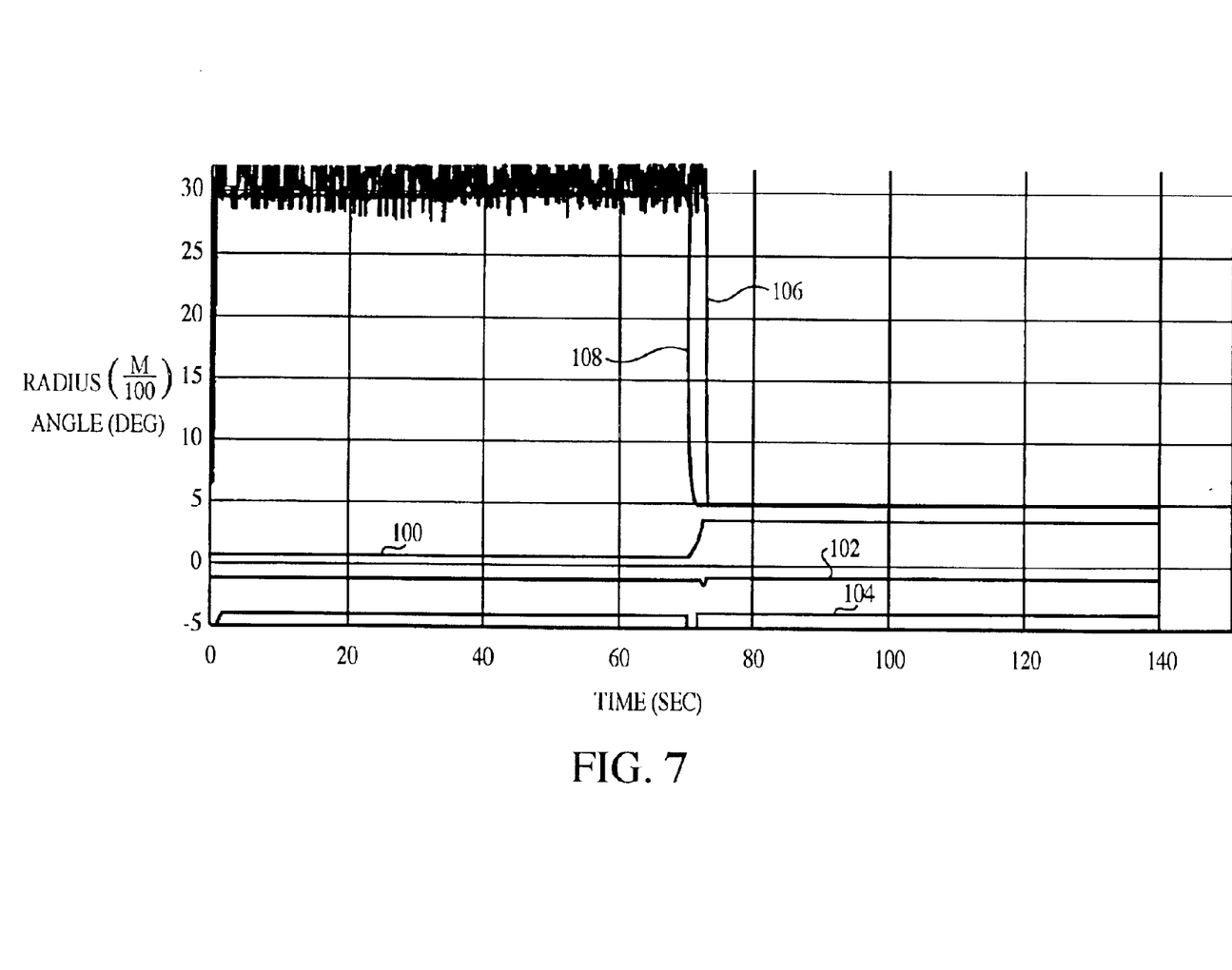
FIG. 7 is a plot of a simulation comparing the curvature of the road estimated from the measured yaw-rate to the curvature obtained from a position trace of the preceding vehicle, according to an embodiment of the present invention.
Figure 8:
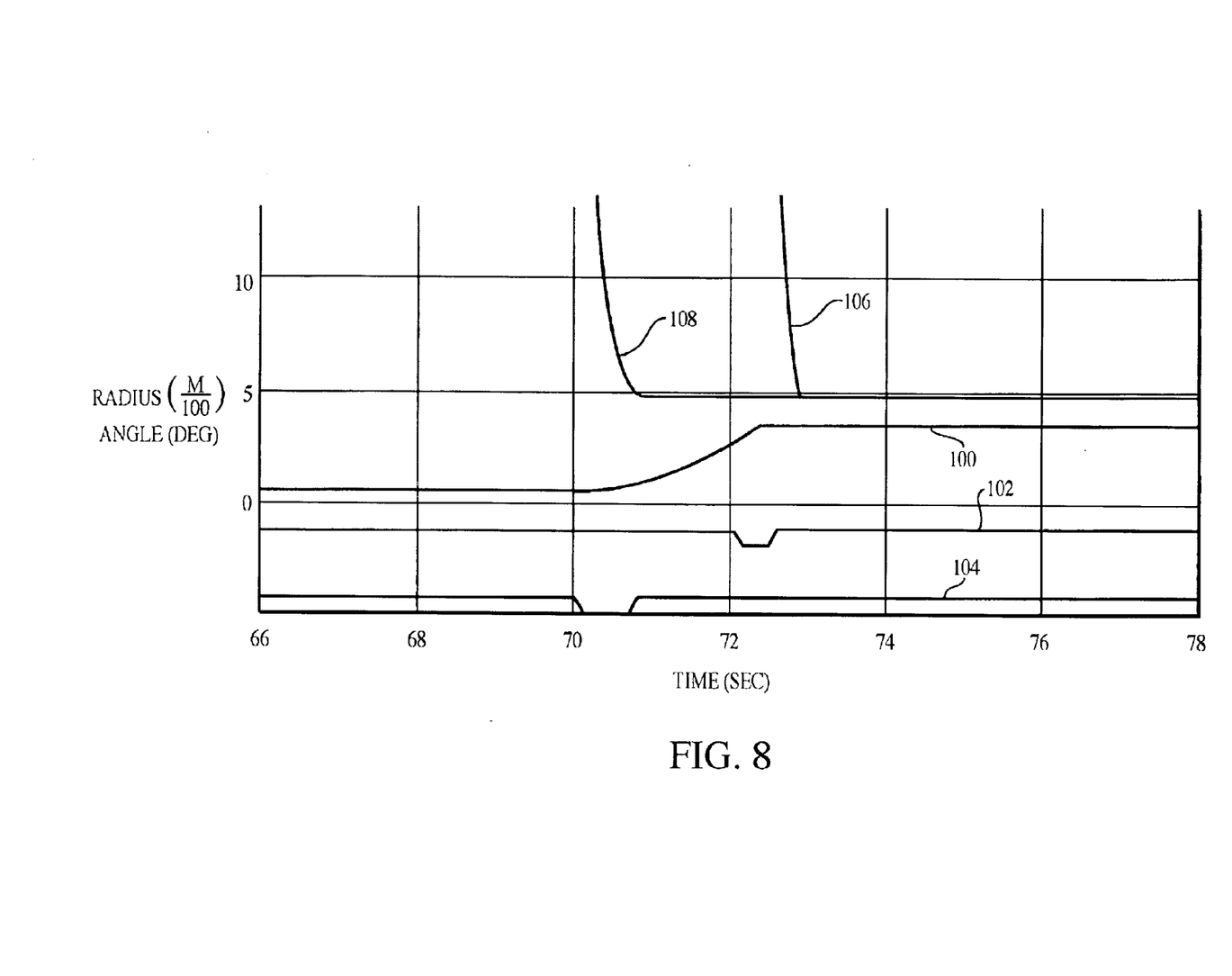
FIG. 8 is an enlarged plot of a portion of the traces shown in FIG. 7, according to an embodiment of the present invention.

Further results of the simulation are shown in FIG. 7. The azimuth angle 100 and the radius of the curve 106 were determined from the yaw-rate measured by the ACC vehicle. The vehicles enter the curve somewhere around time=71 seconds. The radius of the curve as determined from the position trace of the preceding vehicle is indicated by reference number 108. The ability to track the preceding vehicle (the "target tracking ability") of the present method is indicated by reference number 104 and the target tracking ability of a known (yaw-rate based) method is indicated by reference number 102. For traces 102 and 104 a straight portion of the trace ("high") means that the method was able to track the preceding vehicle, while a dip in the trace ("low") means that the method was unable to track, or lost the preceding vehicle. An expanded view of these traces centered around approximately time=72 seconds is shown in FIG. 8.

The plot of the radius as determined from the position trace of the preceding vehicle 108 corresponds well to the plot of the radius as determined from the measured yaw-rate by the ACC vehicle 106. As can be better seen in FIG. 8, the plot of the radius as determined from the position trace of the preceding vehicle 108 precedes the position trace determined from the yaw-rate 106 by approximately 2 seconds. This delay is a result of the preceding vehicle entering the curve before the ACC vehicle. Additionally, the target tracking ability of the present method 104 fails at around t=70. However, at this time the preceding vehicle is still in the small azimuth angle 100. Therefore, the preceding vehicle can be sensed again by the target vehicle sensors and identified as a target vehicle. Therefore, as shown through the simulation, the present method can sufficiently track the target vehicle. In contrast, the tracking ability of the known method fails around t=72. At t=72, the azimuth angle 100 is high. Therefore, the known method will mistakenly determine that the preceding vehicle is not a target vehicle. To achieve a system wherein the tracking ability does not fail, an alternative embodiment that includes the complementary operation of the present method and known method may be implemented. Namely in this complementary method, if either of the methods is "high" at any point in time, this will be interpreted as the 'high' condition. This complementary method can, therefore, maintain tracking throughout its use.

Figure 9:
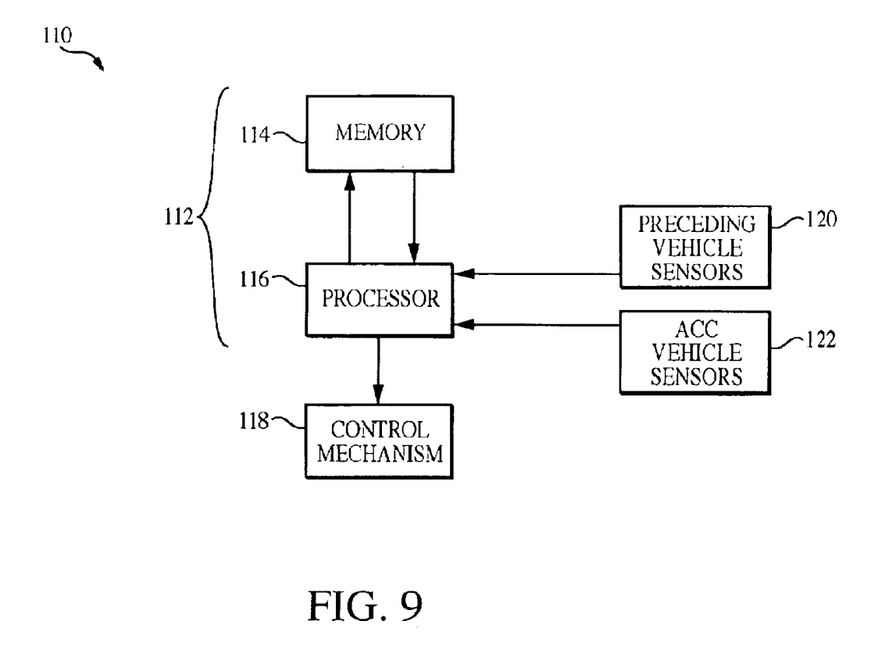
FIG. 9 is a block diagram of an ACC system, according to an embodiment of the present invention.

An ACC system is shown in FIG. 9 and is indicated by reference number 110. This system generally includes sensors 120 and 122, a target identification system 112 and an ACC speed control mechanism 118. In general, the sensors 120 and 122 obtain information regarding the location speed and bearing of the ACC and any preceding vehicles, respectively. The information obtained by the sensors 120 and 122 is used by the target identification system 112 to determine the position trace of any preceding vehicles and which, if any, of the preceding vehicles is a target vehicle. The target identification system 112 then tracks the target vehicle and determines the correct ACC vehicle speed for maintaining or obtaining a safe distance from the target vehicle. The target identification system communicates the determined speed to the control mechanism 118 which controls the speed of the ACC vehicle by sending the appropriate signals to the mechanism for controlling the ACC vehicle's speed.

The sensors 120 and 122 include the preceding vehicle sensors 120 and the ACC vehicle sensors 122. The preceding vehicle sensors 120 generally include a radar source and a detector. Alternatively, the preceding vehicle sensor 120 may include any other electromagnetic (including millimeter wave and laser) and sound sources and/or detectors. The preceding vehicle sensor 120 can obtain the location and azimuth angle of the preceding vehicle relative to the ACC vehicle. The ACC vehicle sensors 122 generally include a speedometer to measure the speed of the ACC and a yaw rate sensor or a steering wheel sensor to determine the position of the ACC vehicle from the angular velocity of the ACC vehicle.

The target identification system 112 generally includes a processor 116 or other devices, circuits, chips or discrete components used to make calculations and memory 114. The processor 112 determines the position trace of the preceding vehicles. The target processor 112 determines which of the preceding vehicles is a target vehicle by determining which of the preceding vehicles is in the path of the ACC vehicle by using the position trace of the preceding vehicle. The memory 114 holds all the information needed by the processor 116. Once a target vehicles is identified, the target vehicle is tracked by the target vehicle sensor.

The control system 118 generally includes a system that controls the ACC vehicle's speed on the basis of the position of the target vehicle relative to the ACC vehicle (obtained by the preceding vehicle sensor) and the speed and position of the ACC vehicle (obtained from the ACC vehicle sensors). The mechanism for controlling the ACC vehicle's speed is generally a throttle control and/or a brake control which is generally controlled by the control system.

Although the invention has been described in terms of specific embodiments and applications, persons skilled in the art can, in light of this disclosure, generate additional embodiments without exceeding the scope or departing from the spirit of the claimed invention. For example, although a method is described as determining the location of a target vehicle during transient situations, it may also be used to determine the location of a target vehicle during the non-transient situation, using the methods as described herein. Furthermore, the methods may be used to determine the curvature, or radius of curve in the road. Furthermore, the apparatuses described herein may comprise many different components, circuits and software implementations. Accordingly, it is to be understood that the drawings and descriptions in this disclosure are proffered to facilitate comprehension of the invention and should not be construed to limit the scope thereof.

I claim:

1. A method for identifying a target vehicle in transient and non-transient situations, comprising:
   determining a position of an ACC vehicle;
   estimating a position of a preceding vehicle relative to the position of the ACC vehicle from the position of the ACC vehicle;
   creating a time-dependent position trace of the preceding vehicle;
   estimating a radius "a" of the position trace of the preceding vehicle by applying circular curve fitting including calculating an equation of a curve estimating the position trace of the preceding vehicle; and
   determining whether the preceding vehicle is in a path of the ACC vehicle by examining a curve fitting error of the curve.

2. A method for identifying a target vehicle in transient and non-transient situations as claimed in claim 1, wherein determining the position of the ACC vehicle comprises:
   assigning a value to the position of the ACC vehicle at time t=0; and
   calculating the position of the ACC vehicle at time t>0 by using a speed and an angular velocity of the ACC vehicle.

3. A method for identifying a target vehicle in transient and non-transient situations as claimed in claim 2, wherein the position of the ACC vehicle comprises an ACC location and an ACC bearing and assigning a value to the position of the ACC vehicle at time t=0 comprises:
   assuming the ACC location of (0,0) in an x-y coordinate system; and
   assuming the ACC bearing along a y-axis of the x-y coordinate system.

4. A method for identifying a target vehicle in transient and non-transient situations as claimed in claim 2, wherein the angular velocity is determined from a lateral velocity and a longitudinal velocity of the ACC vehicle at time t>0 wherein the longitudinal and lateral velocities are calculated from a yaw-rate and a speed of an ACC vehicle, respectively.

5. A method for identifying a target vehicle in transient and non-transient situations as claimed in claim 1, wherein estimating the position of the preceding vehicle comprises estimating the position of the preceding vehicle relative to that of the ACC vehicle, wherein the position relative to the position of the ACC vehicle is determined by the measured distance and azimuth angle, and the position of the ACC vehicle.

6. A method for identifying a target vehicle in transient and non-transient situations as claimed in claim 5, wherein estimating the position of the preceding vehicle further comprises expressing the position of the preceding vehicle as a position in an x-y coordinate system (x(t), y(t)) as a function of the position of the ACC vehicle in the x-y coordinate system (xa(t), ya(t)), an ACC vehicle bearing $\phi_t$, an azimuth angle $\theta_t$, and a distance between the ACC vehicle and the preceding vehicle $R_t$ over a portion of time t=m,m+1, ... ,n−1, n by an equation (x(t), y(t))=(xa(t)+$R_t$ cos($\phi_t$+$\theta_t$), ya(t)+$R_t$ sin($\phi_t$+$\theta_t$)).

7. A method for determining a target vehicle in transient and non-transient situations as claimed in claim 6, wherein creating a time-dependent position trace of the preceding vehicle further comprises estimating the position of the preceding vehicle at a plurality of times.

8. A method for determining a target vehicle in transient and non-transient situations as claimed in claim 6, wherein creating a time-dependent position trace of the preceding vehicle further comprises transforming the time-dependent position trace from an x-y coordinate system into a local coordinate system ($\xi,\eta$).

9. A method for identifying a target vehicle in transient and non-transient situations as claimed in claim 8, transforming the time-dependent position trace from the x-y coordinate system into the local coordinate system ($\xi,\eta$) to define the circle comprises, transforming a plurality of points $(x_n,y_n),(x_{n-1},y_{n-1}),(x_{n-2},y_{n-2}),(x_{n-3},y_{n-3}), \ldots$ in the x-y coordinate system into a second plurality of points $(\xi_n,\eta_n),(0,0),(\xi_{n-2},\eta_{n-2}),(\xi_{n-3},\eta_{n-3}), \ldots$ in the local coordinate system.

10. A method for identifying a target vehicle in transient and non-transient situations as claimed in claim 9, wherein transforming the x-y coordinate to the local coordinate system ($\xi,\eta$) to apply the curve fitting further comprises, using a relationship among the position vector of an i-th point of the preceding vehicle and unit vectors of the local coordinate system defined by $((\hat{r}_i-\hat{r}_{n-1})\bullet\hat{\xi},(\hat{r}_i-\hat{r}_{n-1})\bullet\hat{\eta})$, where $i=n, n-1, n2, \ldots$.

11. A method for identifying a target vehicle in transient and non-transient situations as claimed in claim 1, wherein estimating the radius of the position trace of the preceding vehicle by applying circular curve fitting to the position trace of the preceding vehicle in a local coordinate comprises:
  defining the curve in a local ($\xi,\eta$) coordinate system;
  defining an error in the local ($\xi,\eta$) coordinate system;
  approximating the curve by a quadratic equation; and
  using quadratic regression to calculate the radius "a".

12. A method for identifying a target vehicle in transient and non-transient situations as claimed in claim 11, wherein defining the curve in the local coordinate system comprises assuming the position trace is on the circle, wherein the circle has a radius "a" and is defined by: $(\xi-\xi_c)^2+(\eta-\eta_c)^2=a^2$.

13. A method for identifying a target vehicle in transient and non-transient situations as claimed in claim 11, wherein defining the error in the local coordinate system comprises defining an error "e" between the position trace and the curve, by: $e=\Sigma((\xi_i-\xi_c)^2+(\eta_i-\eta_c)^2-a^2)^2$.

14. A method for identifying a target vehicle in transient and non-transient situations as claimed in claim 11, wherein approximating the curve by quadratic equation comprises defining the curve by:

$$\eta = \frac{1}{2\eta_c}\xi^2 - \frac{\xi_c}{\eta_c}\xi + \frac{(\eta_c^2 - a^2)}{2\eta_c}.$$

15. A method for identifying a target vehicle in transient and non-transient situations as claimed in claim 14, wherein using quadratic regression to calculate the radius "a" comprises, applying quadratic regression to the quadratic equation which defines a as a function of regression coefficients c0 and c2, by $$a = \sqrt{\frac{1}{4\cdot c2^2} - \frac{c0}{c2}}.$$

16. A method for identifying a target vehicle in transient and non-transient situations as claimed in claim 1, wherein determining whether the preceding vehicle is in the path of the ACC vehicle by examining the curve fitting error comprises examining an accuracy of the radius "a".

17. A method for identifying a target vehicle in transient and non-transient situations as claimed in claim 16, wherein examining the accuracy of the radius "a" comprises:

defining a first relationship between a coefficient c2 and a standard deviation of the coefficient c2 "$\sigma_c$," wherein the relationship between c2 and $\sigma_c$ is defined by:

$$\left|\frac{\sigma_{c2}}{c2}\right| < 0.25 \sim 1; \text{ or}$$

defining a second relationship between the radius "a" and a standard deviation of the radius "$\sigma_a$," wherein the relationship between "a" and "$\sigma_a$," is defined by: $|\sigma_a/a|<0.25$;

wherein either of the first or second relationships define a regression criteria.

18. A method for identifying a target vehicle in transient and non-transient situations as claimed in claim 17, wherein examining the accuracy of the radius "a" further comprises defining the preceding vehicle as the target vehicle if the regression criteria are satisfied.

19. A method for identifying a target vehicle in transient and non-transient situations as claimed in claim 1, wherein determining whether the preceding vehicle is in the path of the ACC vehicle by examining the curve fitting error comprises:
  determining a lateral distance between the position of the ACC vehicle and the curve; and
  comparing a magnitude of the lateral distance to a lane width and a vehicle width, using a lateral relationship:
  |lateral distance|$\leq$(lane width+vehicle width)/2,
  wherein if the lateral relationship is satisfied, the preceding vehicle is the target vehicle.

20. A method for identifying a target vehicle in transient and non-transient situations as claimed in claim 19, wherein determining the lateral distance comprises:
  determining a location of a centerline forward point of the ACC vehicle in an x-y coordinate system;
  transforming the location of the centerline forward point to a local coordinate system;
  determining a point on the curve ($\xi_k, \eta_k$), wherein the point on the curve defines a line tangent to the circle and parallel to an ACC vehicle centerline; and
  defining the lateral distance as a distance between the centerline forward point and the point ($\xi_k, \eta_k$).

21. The method according to claim 1, wherein estimating a radius "a" of the position trace includes estimating a radius "a" of a position trace curve defined by positions along the position trace of the preceding vehicle by calculating an equation of a curve estimating the position trace curve.

22. The method according to claim 1, wherein determining whether the preceding vehicle is in the path of the ACC vehicle includes determining whether the preceding vehicle is in the path of the ACC vehicle by examining an error between the curve and the position trace.

23. The method according to claim 22, wherein estimating a radius "a" of the position trace includes estimating a radius "a" of a position trace curve defined by positions along the position trace of the preceding vehicle by calculating an equation of a curve estimating the position trace curve.

24. A method for determining the lane position of a preceding vehicle in transient and non-transient situations, comprising:
  determining a position of an ACC vehicle;
  estimating a position of a preceding vehicle relative to the position of the ACC vehicle from the position of the ACC vehicle to create the preceding vehicle estimated position;

creating a time-dependent position trace of the preceding vehicle;

estimating a radius "a" of the position trace of the preceding vehicle by applying circular curve fitting including calculating an equation of a curve estimating the position trace of the preceding vehicle; and determining whether the preceding vehicle is in an ACC vehicle lane by examining a curve fitting error of the curve.

25. A method for determining the lane position of a preceding vehicle in transient and non-transient situations as claimed in claim 24, wherein estimating the position of the preceding vehicle relative to the position of the ACC vehicle from the position of the ACC vehicle to create the preceding vehicle estimated position comprises, determining a distance between the ACC vehicle and the preceding vehicle and determining an azimuth angle between the ACC vehicle and the preceding vehicle.

26. A method for determining the lane position of a preceding vehicle in transient and non-transient situations as claimed in claim 24, wherein creating the time-dependent position trace of the preceding vehicle comprises, estimating the time-dependent position trace from a plurality of positions of the preceding vehicle.

27. A method for determining the lane position of a preceding vehicle in transient and non-transient situations as claimed in claim 24, wherein estimating the radius of the position trace by applying circular curve fitting to the position trace of the preceding vehicle comprises, obtaining a curve in a local coordinate system with the radius so that an error between the curve and the position trace is minimized.

28. A method for determining the lane position of a preceding vehicle in transient and non-transient situations as claimed in claim 27, wherein obtaining a curve in the local coordinate system comprises selecting an origin approximately near or approximately at one of the plurality of positions of the preceding vehicle.

29. A method for determining the lane position of a preceding vehicle in transient and non-transient situations as claimed in claim 27, obtaining the curve in the local coordinate system wherein a first axis of the local coordinate system is approximately tangent to the curve and a second axis of the coordinate system is normal to the first axis.

30. A method for determining the lane position of a preceding vehicle in transient and non-transient situations as claimed in claim 24, wherein determining whether the preceding vehicle is in an ACC vehicle lane by examining a curve fit error, comprises: defining regression criteria and determining whether the regression criteria are met.

31. A method for determining the lane position of a preceding vehicle in transient and non-transient situations as claimed in claim 24, wherein determining whether the preceding vehicle is in an ACC vehicle lane by examining a curve fit error, comprises: determining a lateral distance between the position of the ACC vehicle and the curve.

32. The method according to claim 24, wherein determining whether the preceding vehicle is in the path of the ACC vehicle includes determining whether the preceding vehicle is in the path of the ACC vehicle by examining an error between the curve and the position trace.

33. A target identification system, comprising:
a memory device that stores position information of an ACC vehicle and a distance and azimuth angle between the ACC vehicle and a preceding vehicle;
a processor and computer software that
computes a position of a target vehicle using the position information of the ACC vehicle and the distance and azimuth angle;
creates a position trace;
transforms the position trace into a local coordinate system $(\xi,\eta)$; and
estimates a radius of the position trace using curve fitting, and quadratic regression.

34. An ACC system, comprising:
a target vehicle sensor;
at least one ACC vehicle sensor;
the target identification system as claimed in claim 33; and
an ACC vehicle control mechanism.

35. A method for identifying a target vehicle in transient and non-transient situations, comprising:
determining a position of an ACC vehicle;
estimating a position of a preceding vehicle relative to the position of the ACC vehicle from the position of the ACC vehicle;
creating a time-dependent position trace of the preceding vehicle;
estimating a radius "a" of the position trace of the preceding vehicle by applying circular curve fitting to the position trace of the preceding vehicle to create a curve;
determining whether the preceding vehicle is in a path of the ACC vehicle by examining a curve fitting error;
wherein estimating the position of the preceding vehicle comprises estimating the position of the preceding vehicle relative to that of the ACC vehicle, wherein the position relative to the position of the ACC vehicle is determined by the measured distance and azimuth angle, and the position of the ACC vehicle; and
wherein estimating the position of the preceding vehicle further comprises expressing the position of the preceding vehicle as a position in an x-y coordinate system (x(t), y(t)) as a function of the position of the ACC vehicle in the x-y coordinate system (xa(t), ya(t)), an ACC vehicle bearing $\phi_t$, an azimuth angle $\theta_t$, and a distance between the ACC vehicle and the preceding vehicle $R_t$ over a portion of time $t=m, m+1, \ldots, n-1, n$ by an equation $(x(t), y(t))=(xa(t)+R_t \cos(\phi_t+\theta_t), ya(t)+R_t \sin(\phi_t+\theta_t))$.

36. A method for identifying a target vehicle in transient and non-transient situations, comprising:
determining a position of an ACC vehicle;
estimating a position of a preceding vehicle relative to the position of the ACC vehicle from the position of the ACC vehicle;
creating a time-dependent position trace of the preceding vehicle;
estimating a radius "a" of the position trace of the preceding vehicle by applying circular curve fitting to the position trace of the preceding vehicle to create a curve;
determining whether the preceding vehicle is in a path of the ACC vehicle by examining a curve fitting error;
wherein estimating the radius of the position trace of the preceding vehicle by applying circular curve fitting to the position trace of the preceding vehicle in a local coordinate comprises:
defining the curve in a local $(\xi,\eta)$ coordinate system;
defining an error in the local $(\xi,\eta)$ coordinate system;
approximating the curve by a quadratic equation; and
using quadratic regression to calculate the radius "a".

* * * * *